(12) United States Patent
Ajiro

(10) Patent No.: US 10,401,936 B2
(45) Date of Patent: Sep. 3, 2019

(54) POWER CONTROL SYSTEM AND POWER CONTROL METHOD

(71) Applicant: NEC Corporation, Tokyo (JP)

(72) Inventor: Shinya Ajiro, Tokyo (JP)

(73) Assignee: NEC Corporation, Tokyo (JP)

( * ) Notice: Subject to any disclaimer, the term of this patent is extended or adjusted under 35 U.S.C. 154(b) by 111 days.

(21) Appl. No.: 15/278,398

(22) Filed: Sep. 28, 2016

(65) Prior Publication Data

US 2017/0090544 A1 Mar. 30, 2017

(30) Foreign Application Priority Data

Sep. 29, 2015 (JP) .................................. 2015-191063

(51) Int. Cl.
*G06F 1/26* (2006.01)
*G06F 1/3206* (2019.01)

(52) U.S. Cl.
CPC .............. *G06F 1/3206* (2013.01); *G06F 1/26* (2013.01); *G06F 1/263* (2013.01)

(58) Field of Classification Search
None
See application file for complete search history.

(56) References Cited

U.S. PATENT DOCUMENTS

2008/0133076 A1* 6/2008 Formanski .......... B60L 11/1881
701/22
2009/0094473 A1* 4/2009 Mizutani ............... G06F 1/3203
713/340
2011/0252247 A1* 10/2011 Yokoyama ................ H02J 7/34
713/300
2014/0012426 A1* 1/2014 Funakubo ................. H02J 3/32
700/286
2014/0354047 A1* 12/2014 Markhovsky ......... H02J 7/0068
307/23
2015/0303690 A1* 10/2015 Miyazaki .................. H02J 7/34
700/291
2016/0241071 A1* 8/2016 Naito .................... H01M 10/44

FOREIGN PATENT DOCUMENTS

JP 2003-150281 5/2003
JP 2007-032387 2/2007
JP 2013-115927 6/2013

OTHER PUBLICATIONS

Notification of Reasons for Refusal dated Jan. 22, 2019, issued by the Japanese Patent Office (JPO) in counterpart Japanese Patent Application No. 2016-139976.

* cited by examiner

*Primary Examiner* — Jaweed A Abbaszadeh
*Assistant Examiner* — Brian J Corcoran
(74) *Attorney, Agent, or Firm* — Finnegan, Henderson, Farabow, Garrett & Dunner, L.L.P.

(57) ABSTRACT

A system of the present invention includes: a storage unit configured to store the value of consumed energy of an information processing device configured to be supplied with power by a power supply device and a power storage device charged by the power supply device; and a calculation unit configured to calculate a power supply device upper limit value set as the upper limit value of a value representing a characteristic of energy supplied from the power supply device to the information processing device. The calculation unit is configured to calculate the power supply device upper limit value on the basis of the consumed energy in a predetermined period.

11 Claims, 12 Drawing Sheets

POWER CONTROL SYSTEM AND POWER CONTROL METHOD

INCORPORATION BY REFERENCE

The present invention is based upon and claims the benefit of priority from Japanese patent application No. 2015-191063, filed on Sep. 29, 2015, the disclosure of which is incorporated herein in its entirety by reference.

TECHNICAL FIELD

The present invention relates to a system, and in particular, to a system which calculates the value of power supplied from a power supply device and a power storage device to an information processing device. Further, the present invention relates to a control device which controls power supplied from a power supply device and a power storage device to an information processing device. Furthermore, the present invention relates to a power supply system, a program, an arithmetic method, and a power control method.

BACKGROUND ART

In recent years, information processing devices are used in various systems. Meanwhile, power consumption of an information processing device varies according to change in a requested processing load and a processing status such that an application has a peak time. As such, in order to realize stable operation, power control in an information processing device is important. In particular, an information processing device such as a server device required to operate full time needs to avoid server down due to power supply shortage.

As a technology to control power of an information processing device in accordance with the abovementioned situation, for example, a technology called a power peak assist function as shown in Patent Document 1 has been known. In order to realize the power peak assist function, first, a power supply device and a battery are provided as a power supply module. Then, in addition to power supply by the power supply device to the information processing device, power supply by the battery assists power consumption of the information processing device as the power peak assist function.

An example of the power peak assist function will be further described specifically. First, in order to realize the power peak assist function, in addition to the power supply module described above, a peak assist control device, which controls power supplied from the power supply device and the battery to the information processing device, is provided. The peak assist control device extracts the residual amount of energy in the battery from the power supply module and, on the basis of the information, notifies permissible power consumption value to the information processing device. Thus, the information processing device can operate within the range of the notified power consumption value, and power is supplied from the power supply device and the battery up to the power consumption value. Further, in a case where the residual amount of energy in the battery is short, the peak assist control device controls the information processing device to operate within the value range of power available only from the power supply device.

Patent Document 1: Japanese Unexamined Patent Application Publication No. 2003-150281

The peak assist function described above fixes the setting of a power supply device upper limit value, which is the upper limit value of power available solely from the power supply device. However, in a case where the power supply device upper limit value is set to a low value, power supply by the power supply device is not enough and power is often supplied from the battery to the information processing device. In this case, the residual energy in the battery is reduced significantly, causing problems that the information processing device goes down due to battery shortage and that performance lowers because of occurrence of power capping. On the other hand, in a case where the power supply device upper limit value is set to a high value, opportunities to power supply by the battery are reduced, so that advantages of the peak assist function are not taken. This causes a problem of useless facilities. In other words, in a system having the peak assist function, the abovementioned problems arise in a case where the power supply device upper limit value is improperly set.

SUMMARY OF THE INVENTION

In view of the above, an object of the present invention is to solve the problem that the power supply device upper limit value cannot be properly set in a system having the peak assist function.

A system as an aspect of the present invention includes:

a storage unit configured to store a value of consumed energy of an information processing device configured to be supplied with power by a power supply device and a power storage device charged by the power supply device; and a calculation unit configured to calculate a power supply device upper limit value set as an upper limit value of a value representing a characteristic of energy supplied from the power supply device to the information processing device.

The calculation unit is configured to calculate the power supply device upper limit value on a basis of the consumed energy in a predetermined period.

Further, a control device as another aspect of the present invention includes:

a control unit configured to control supply of power to an information processing device by a power supply device and a power storage device charged by the power supply device;

a detection unit configured to detect consumed energy of the information processing device and store the consumed energy into a storage unit; and a calculation unit configured to calculate a power supply device upper limit value as an upper limit value of a value representing a characteristic of energy supplied from the power supply device to the information processing device.

The calculation unit is configured to calculate the power supply device upper limit value on a basis of the consumed energy in a predetermined period; and the control unit is configured to control the value representing the characteristic of energy supplied from the power supply device not to exceed the power supply device upper limit value calculated by the calculation unit.

Further, a power supply system as another aspect of the present invention includes:

a power supply module including a power supply device and a power storage device charged by the power supply device; and a control device having a control unit configured to control supply of power to an information processing device by the power supply module.

The control device includes:

a detection unit configured to detect consumed energy of the information processing device and store the consumed energy into a storage unit; and a calculation unit configured to calculate a power supply device upper limit value as an upper limit value of a value representing a characteristic of energy supplied from the power supply device to the information processing device.

The calculation unit is configured to calculate the power supply device upper limit value on a basis of the consumed energy in a predetermined period; and the control unit is configured to control the value representing the characteristic of energy supplied from the power supply device not to exceed the power supply device upper limit value calculated by the calculation unit.

A non-transitory computer-readable medium storing a program as another aspect of the present invention includes instructions for causing an arithmetic device to realize:

a calculation unit configured to calculate a power supply device upper limit value on a basis of consumed energy of an information processing device in a predetermined period among values of consumed energy of the information processing device, the power supply device upper limit value being set as an upper limit value of a value representing a characteristic of energy supplied from the power supply device to the information processing device, the information processing device being configured to be supplied with power by a power supply device and a power storage device charged by the power supply device, the values of the consumed energy being stored in a storage device.

Further, an arithmetic method as another aspect of the present invention includes:

storing a value of consumed energy of an information processing device configured to be supplied with power by a power supply device and a power storage device charged by the power supply device; and calculating a power supply device upper limit value on a basis of the stored consumed energy in a predetermined period, the power supply device upper limit value being set as an upper limit value of a value representing a characteristic of energy supplied from the power supply device to the information processing device.

Further, a power supply method as another aspect of the present invention is a power supply method for controlling supply of power to an information processing device by a power supply device and a power storage device charged by the power supply device, and the power supply method includes:

detecting consumed energy of the information processing device and storing the consumed energy into a storage unit;

calculating a power supply device upper limit value on a basis of the stored consumed energy in a predetermined period, the power supply device upper limit value being an upper limit value of a value representing a characteristic of energy supplied from the power supply device to the information processing device; and controlling the value representing the characteristic of energy supplied from the power supply device not to exceed the calculated power supply device upper limit value.

With the configurations as described above, the present invention can eliminate waste of facilities and increase performance in a system having the peak assist function.

EXEMPLARY EMBODIMENT

First Exemplary Embodiment

Figure 1:
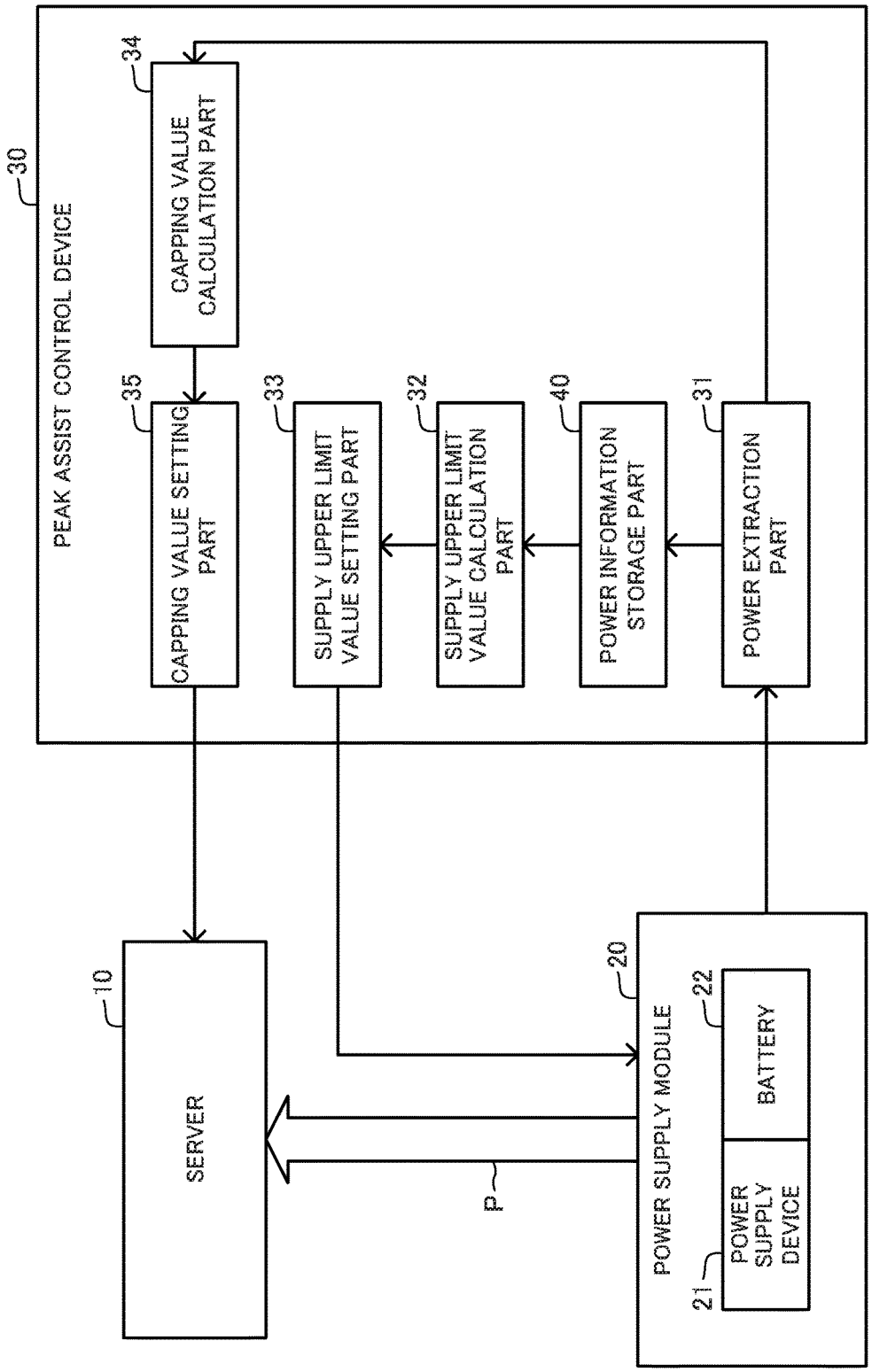
FIG. 1 is a block diagram showing the configuration of an information processing system according to a first exemplary embodiment of the present invention.
Figure 10:
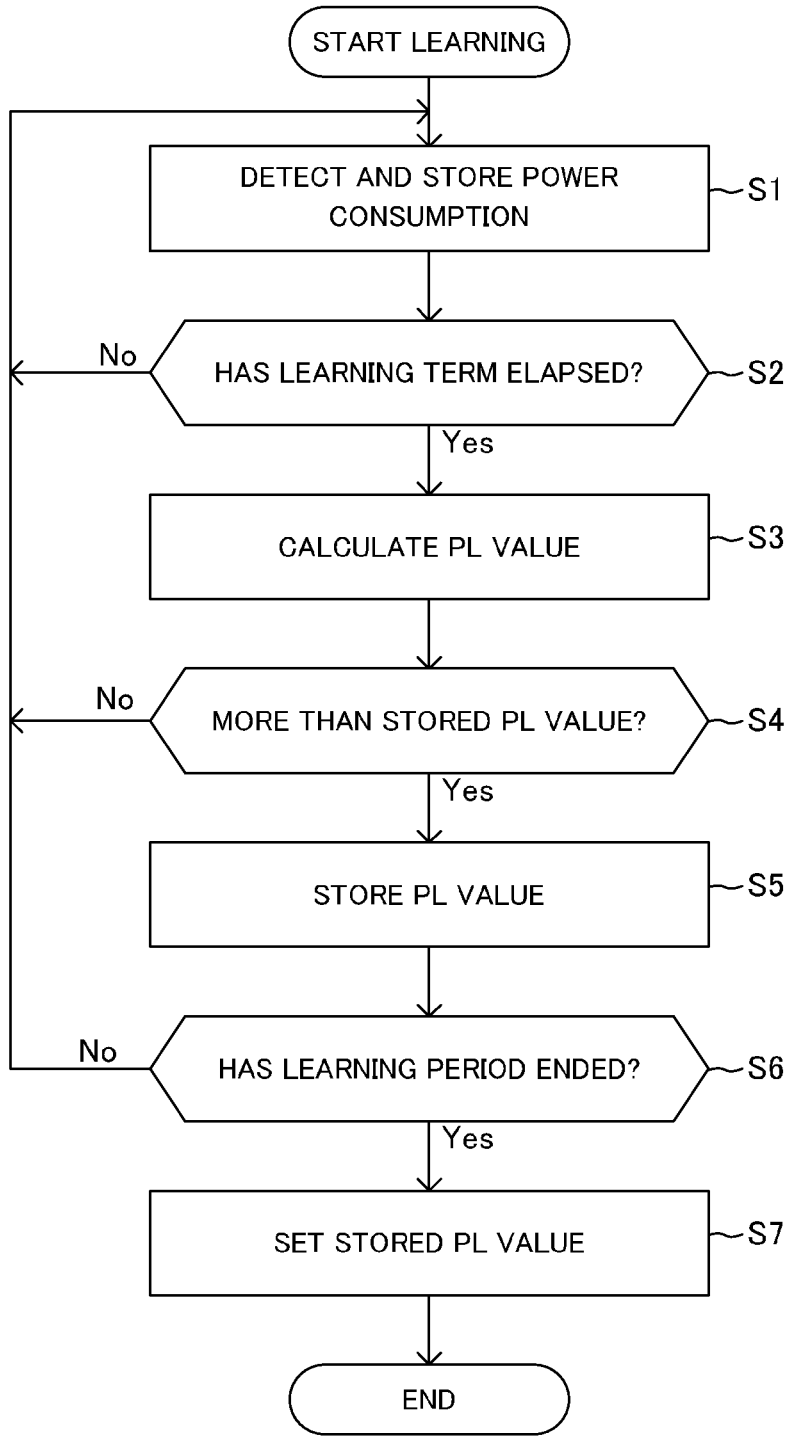
FIG. 10 is a flowchart describing a PL value setting operation in the information processing system disclosed in FIG. 1.
Figure 11:
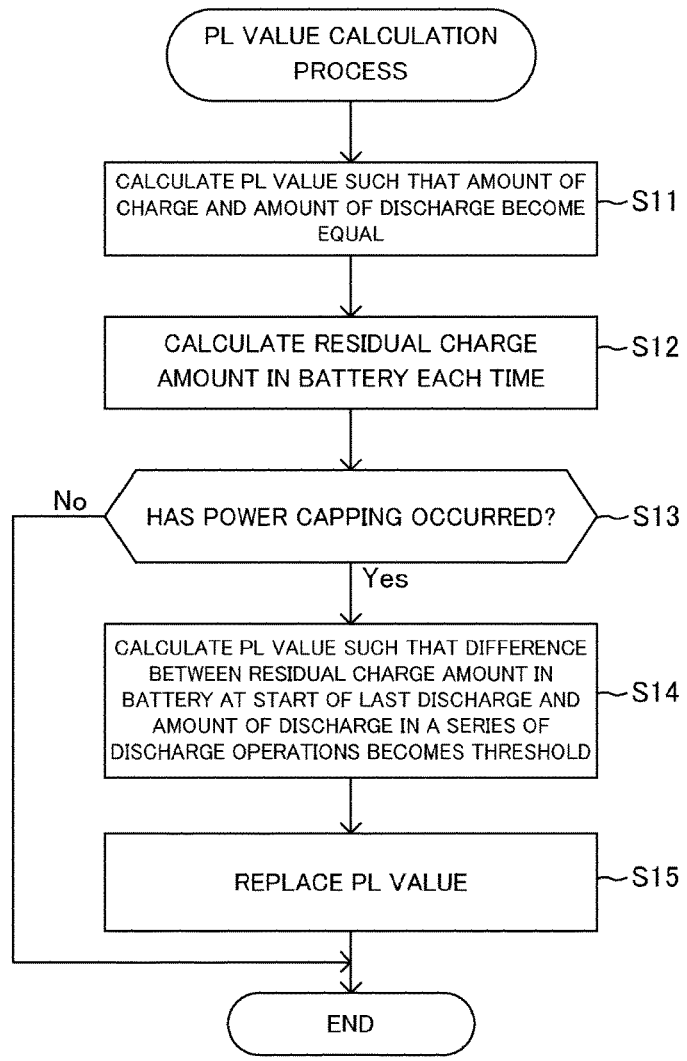
FIG. 11 is a flowchart describing the PL value calculating operation in the information processing system disclosed in FIG. 1.

A first exemplary embodiment of the present invention will be described referring to FIGS. 1 to 11. FIG. 1 is a diagram for describing the configuration of an information processing system according to the first exemplary embodiment. FIGS. 2 to 9 are diagrams showing examples of consumed energy and a PL value calculation method. FIGS. 10 and 11 are diagrams for describing the operation of a peak assist control device.

The information processing system according to this exemplary embodiment includes a server 10, which is an information processing device including an arithmetic device and a storage device, a power supply module 20 supplying power P to the server 10, and a peak assist control device 30 controlling power supply from the power supply module 20 to the server 10 as shown in FIG. 1.

For example, the information processing system described above is configured in the form of a rack server. In other words, the information processing system 1 has a configuration such that each of the devices configuring the information processing system is housed on each shelf of a rack having a plurality of shelves. As an example, the information processing system is configured in a manner that a server group composed of a plurality of servers 10, the power supply module 20, and a rack manager including the peak assist control device 30 are mounted on each unit, which is each shelf of the server rack. However, the information processing system is not limited to the configuration in the form of the rack server.

The server 10 operates with power supplied from the power supply module 20. As shown in FIG. 1, the power supply module 20 includes a power supply device 21 that converts power from an AC power source into DC power and supplies it to the server 10, and a battery 22 that stores power and also supplies the power to the server 10 (a power storage device). The power supply module 20 is configured in a manner that the power supply device 21 and the battery 22 cooperate with each other to supply power required by the server 10. The battery 22 may be any device that can store power and supply the stored power to the server 10.

When the server 10 requires the power supply module 20 to supply power more than power available from the power supply device 21, power is supplied not only from the power supply device 21 but also from the battery 22. In this case, the residual amount of the power stored in the battery 22 decreases. On the other hand, when the server 10 needs power equal to or less than power available from the power supply device 21, power is supplied only from the power supply device 21. In this case, the residual power that can be supplied from the power supply device 21 is stored into the battery 22. Such a power supply status is realized by operation of the peak assist function incorporated in the peak assist control device 30.

In the power supply module 20, a PL value (a power supply device upper limit value), which is the upper limit value of power supplied from the power supply device 21 to the server 10, is set. As such, the power supply device 21 operates so as to supply power not exceeding the set PL value to the server 10. Because a PL value is set in the peak assist control device 30 as described later, the peak assist control device 30 executes control so that power supply from the power supply device 21 does not exceed the PL value. In other words, when power consumption by the server 10 exceeds the PL value, the peak assist control device 30 executes control so as to supply power to the server 10 not only from the power supply device 21 but also from the battery 22.

The peak assist control device 30 (a system) is formed of an information processing device having an arithmetic device and a storage device. The peak assist control device 30 includes a power extraction part 31, a supply upper limit value calculation part 32, a supply upper limit value setting part 33, a capping value calculation part 34, and a capping value setting part 35, which are constructed by a program installed in the arithmetic device provided therein. The peak assist control device 30 also has the abovementioned peak assist function for controlling the status of power supply to the server 10 as a basic function, although it not shown. Moreover, the peak assist control device 30 includes a power information storage part 40 formed in the storage device provided therein.

When operating, the peak assist control device 30 in the present invention distinguishes a "learning period" for calculating a PL value from an "operating period" after setting the calculated PL value. The function and operation of each component in the "learning period" and the "operating period" will be described below. The "learning period" is assumed to have a length such as one month or two months, but may have any length.

The power extraction part 31 (a detection unit) periodically detects power consumed by the server 10. In this exemplary embodiment, the power extraction part 31 detects power supplied from the power supply module 20 as power consumed by the server 10. Then, the power extraction part 31 notifies the power consumption to the power information storage part 40 and the capping value calculation part 34. The power extraction part 31 also detects the residual amount of energy in the battery 22 and notifies it to the capping value calculation part 34.

In the "learning period," the power extraction part 31 measures power consumption in accordance with change of the processing status of the server 10, so that there is a need to cause the server 10 to operate so that power capping does not occur. Therefore, in the "learning period," a PL value may be preset to a high value to avoid power shortage of the server 10 and power may be supplied to the server 10 only from the power supply device 21. Otherwise, power may be supplied to the server 10 from the power supply module 20 including the battery 22.

Figure 2:
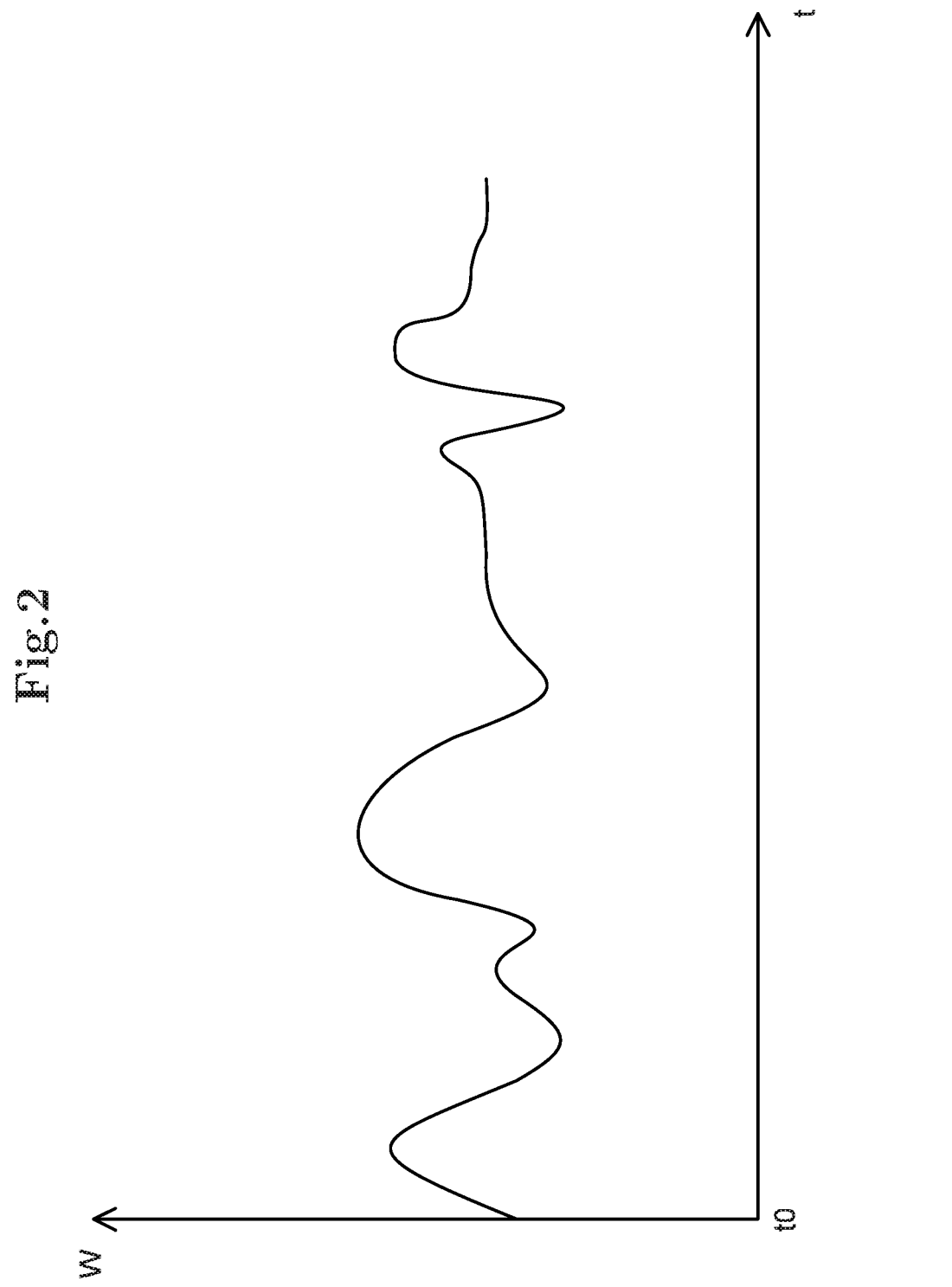
FIG. 2 is a diagram showing an example of consumed energy of a server disclosed in FIG. 1.

In the "learning period," the power extraction part 31 stores the detected power consumption with detection time into the power information storage part 40 (step S1 of FIG. 10). FIG. 2 is a diagram showing an example of detected and stored power consumption, where the vertical axis takes time and the horizontal axis takes power consumption. As shown in the drawing, the processing status of the server 10 varies with time, so that power consumption also varies with time.

The power consumption stored in the power information storage part 40 shown in FIG. 2 is not necessarily limited to power consumption detected by the power extraction part 31. Power consumption detected by any method or calculated by simulation may be stored into the power information storage part 40 in advance.

In the "learning period," the supply upper limit value calculation part 32 (a calculation unit) calculates a PL value in the following manner by using power consumption data stored in the power information storage part 40. Herein, the supply upper limit value calculation part 32 is assumed to calculate a PL value in parallel with measurement and storage of power consumption by the power extraction part 31. Moreover, three learning periods ST1, ST2 and ST3 are assumed to be preset in the following description.

Figure 3:
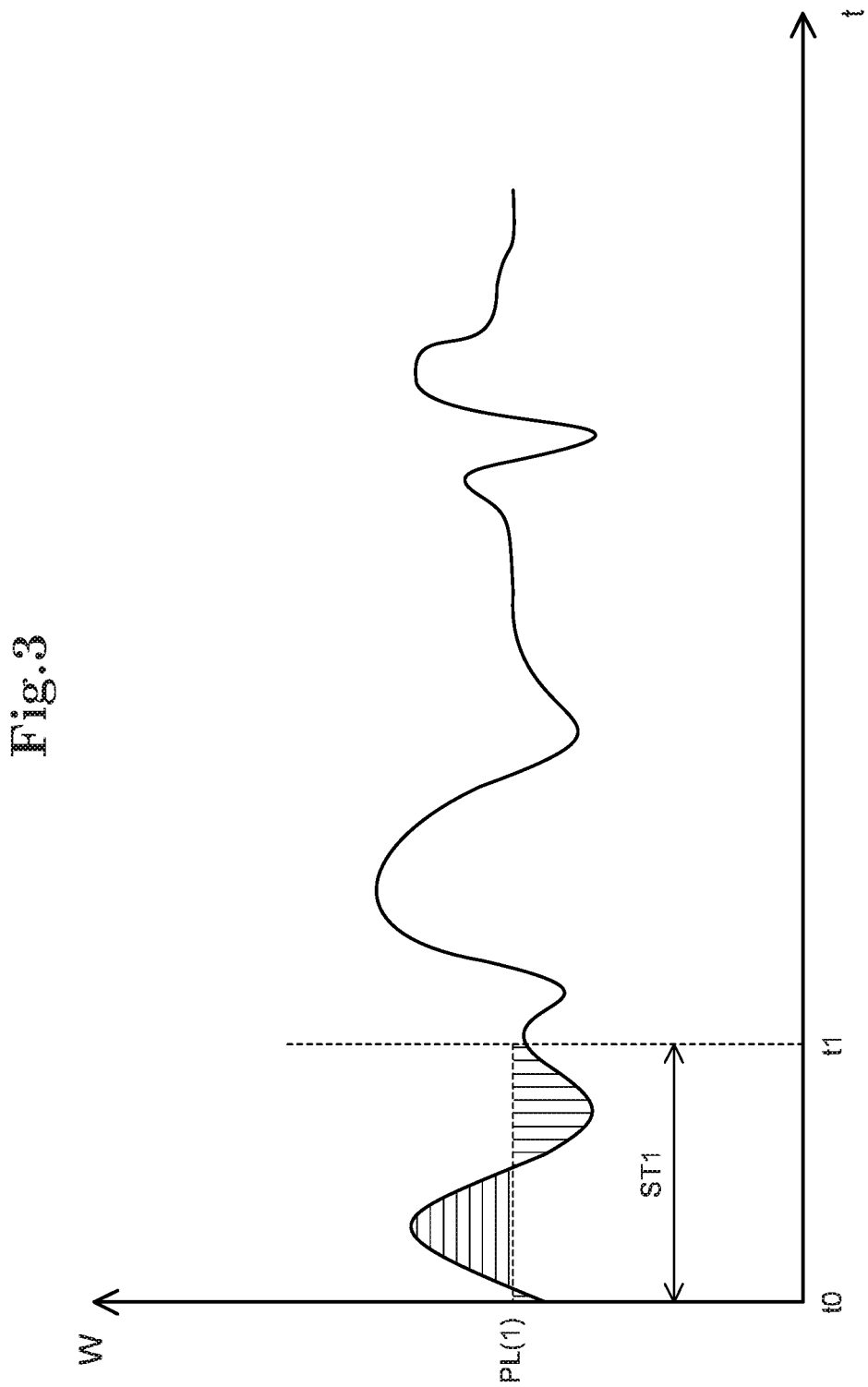
FIG. 3 is a diagram for describing an example of a PL value calculation method based on the consumed energy disclosed in FIG. 2.

First, the supply upper limit value calculation part 32 checks whether or not a preset learning period has passed (step S2 of FIG. 10). As shown in FIG. 3, the current time is assumed to be t1 and the learning period ST1 is assumed to have elapsed from learning start time t0 (step S2 of FIG. 10: Yes). Then, the supply upper limit value calculation part 32 calculates a PL value by using the data of the power consumption in the learning period ST1 (step S3 of FIG. 10).

Now, a PL value calculation process (step S3 of FIG. 10) will be described in detail referring to a flowchart of FIG. 11. As shown in FIG. 3, the supply upper limit value calculation part 32 calculates a PL value by using data of consumed energy in the learning period ST1, which is a period from the learning period start time t0 to the current time t1. To be specific, the supply upper limit value calculation part 32 estimates the amount of charge into the battery 22 and the amount of discharge from the battery 22 in the entire learning period ST1 by using the data of the consumed energy in the learning period ST1, and calculates a PL value such that the amount of charge balances with the amount of discharge, that is, the amount of charge is equal to the amount of discharge (step S11 of FIG. 11).

Describing with reference to FIG. 3, first, when a provisional PL value is estimated, in a case where the power consumption is less than the PL value, power equivalent to a gap between the power consumption and the PL value is stored into the battery 22 from the power supply device 21, and the stored energy is the amount of charge (a portion shaded with vertical lines in FIG. 3). On the other hand, when a provisional PL value is estimated, in a case where the power consumption is more than the PL value, the excess power over the PL value is supplied to the server 10 from the battery 22, and the excess energy is the amount of discharge (a portion shaded with horizontal lines in FIG. 3). In other words, the amount of charge and the amount of discharge in the learning period ST1 can be calculated by integrating consumed energy E with reference to the provisional PL value. Thus, a PL value such that the amount of charge becomes equal to the amount of discharge is calculated. In the example shown in FIG. 3, a value PL(1) is assumed to be calculated as the PL value in the learning period ST1.

After that, the supply upper limit value calculation part 32 performs next calculation and, when necessary, calculates a new PL value in the learning period ST1. First, the supply upper limit value calculation part 32 performs simulation, which is setting the calculated PL value PL(1) for the consumed energy in the learning period ST1, estimating the amount of charge stored into the battery 22 and the amount of discharge from the battery 22 associated with change of time, and calculating the residual power in the battery 22 (step S12 of FIG. 11). Then, the supply upper limit value calculation part 32 checks whether or not the residual energy in the battery 22 runs short in the learning period ST1, that is, whether or not the residual energy in the battery 22 becomes equal to or less than a threshold (for example, "0") which is set so that power capping for limiting power consumption of the server 10 occurs (step S13 of FIG. 11). Meanwhile, the supply upper limit value calculation part 32 may determine whether or not the residual energy in the battery 22 runs short, by comparing an actual measurement value of the residual energy in the battery 22 with the threshold.

In the case of determining that the residual energy in the battery 22 is equal to or less than the threshold and power capping will occur (step S13 of FIG. 11: Yes), the supply upper limit value calculation part 32 recalculates the PL value for the learning period ST1 (steps S14 and S15 of FIG. 11). However, power capping is assumed not to occur in the learning period ST1 (step S13 of FIG. 11: No), and the value PL(1) is assumed to be calculated as the PL value of the learning period ST1.

Subsequently, the supply upper limit value calculation part 32 compares the calculated PL value with a PL value calculated and stored before (step S4 of FIG. 10), and stores a larger one (step S5 of FIG. 10). Because a PL value has not been calculated before, the supply upper limit value calculation part 32 stores the value PL(1), which is the currently calculated PL value.

Then, the supply upper limit value calculation part 32 checks whether or not all the preset learning periods end (step S6 of FIG. 10). Herein, because the other learning periods ST2 and ST3 are set, the supply upper limit value calculation part 32 repeats the abovementioned process (step S6 of FIG. 10: No). In other words, the supply upper limit value calculation part 32 performs detection and storage of power consumption during the next learning period ST2 (step S1 and step S2 of FIG. 10; step S2: Yes) and, when the learning period ST2 elapses, calculates a PL value (step S3 of FIG. 10).

Figure 4:
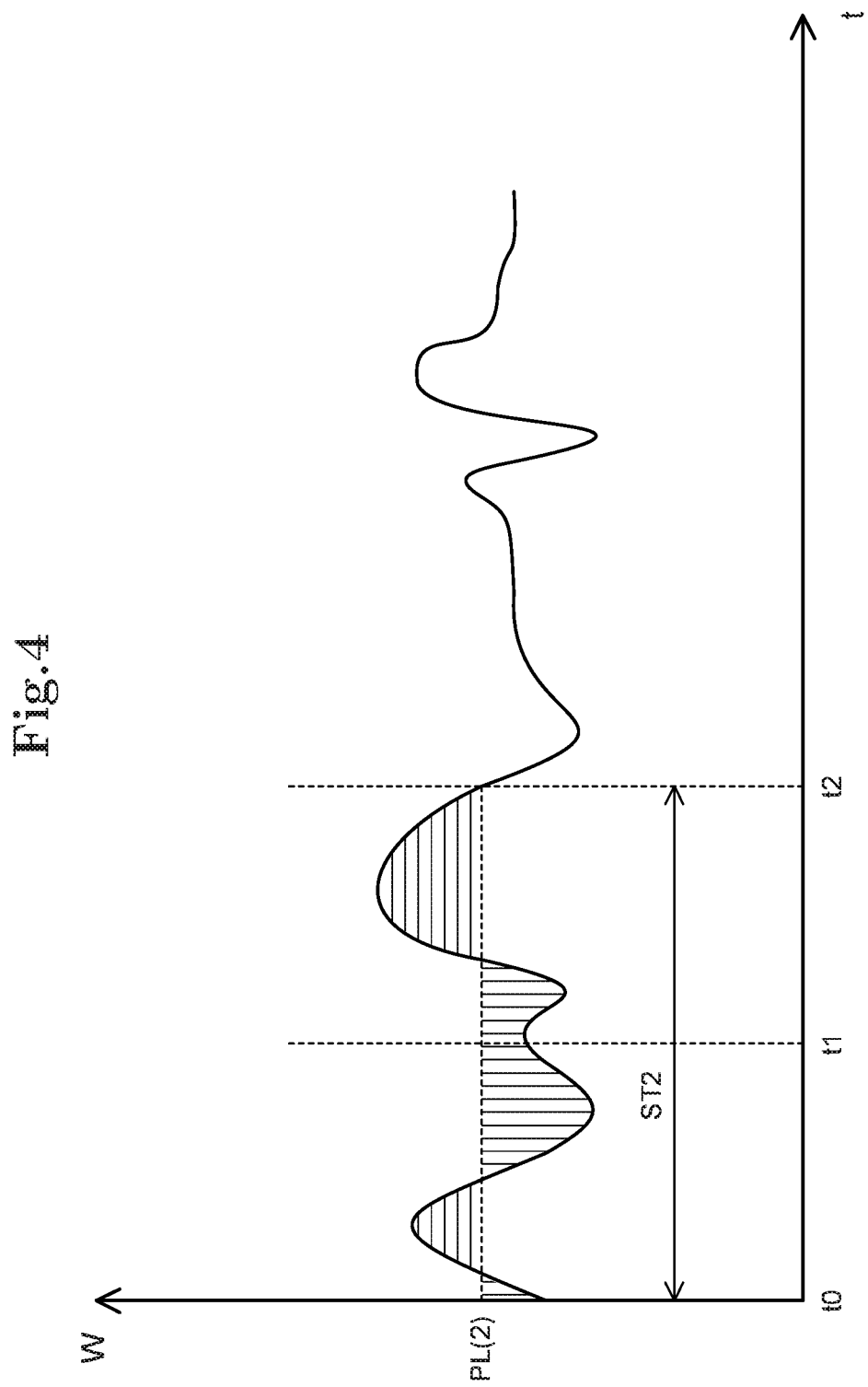
FIG. 4 is a diagram for describing the example the PL value calculation method based on the consumed energy disclosed in FIG. 2.

As shown in FIG. 4, when the learning period ST2 from the learning period start time t0 to the current time t2 elapses, the supply upper limit value calculation part 32 calculates a PL value by using data of consumed energy in the learning period ST2. To be specific, the supply upper limit value calculation part 32 estimates the amount of charge stored into the battery 22 and the amount of discharge from the battery 22 in the entire learning period ST2 by using data of consumed energy in the learning period ST2, and calculates a PL value such that the amount of charge balances with the amount of discharge, that is, the amount of charge is equal to the amount of discharge (step S11 of FIG. 11). In the example shown in FIG. 4, a value PL(2) is assumed to be calculated as the PL value of the learning period ST2.

After that, the supply upper limit value calculation part 32 determines whether or not power capping will occur, by using the calculated PL value (steps S12 and S13 of FIG. 11) and, in the case of determining that power capping will occur, recalculates the PL value in the learning period ST2 (steps S14 and S15 of FIG. 11). Meanwhile, power capping is assumed not to occur in the learning period ST2 (step S13 of FIG. 11: No), and PL(2) is assumed to be calculated as the PL value of this learning period.

Subsequently, the supply upper limit value calculation part 32 compares the calculated PL value with a PL value calculated and stored before (step S4 of FIG. 10), and stores a larger one (step S5 of FIG. 10). Herein, although the PL value of the learning period ST1, namely, PL(1) is already stored, the PL value of the learning period ST2, namely, PL(2) is larger. Therefore, the supply upper limit value calculation part 32 stores the value PL(2).

Then, the supply upper limit value calculation part 32 checks whether or not all the preset learning periods end (step S6 of FIG. 10). Herein, the other learning period ST3 is set, so that the supply upper limit value calculation part 32 again executes the abovementioned process (step S6 of FIG. 10: No). In other words, the supply upper limit value calculation part 32 performs detection and storage of power consumption until the next learning period ST3 elapses (steps S1 and S2 of FIG. 10; step S2: Yes), and calculates the PL value when the learning period ST3 elapses (step S3 of FIG. 10).

Figure 5:
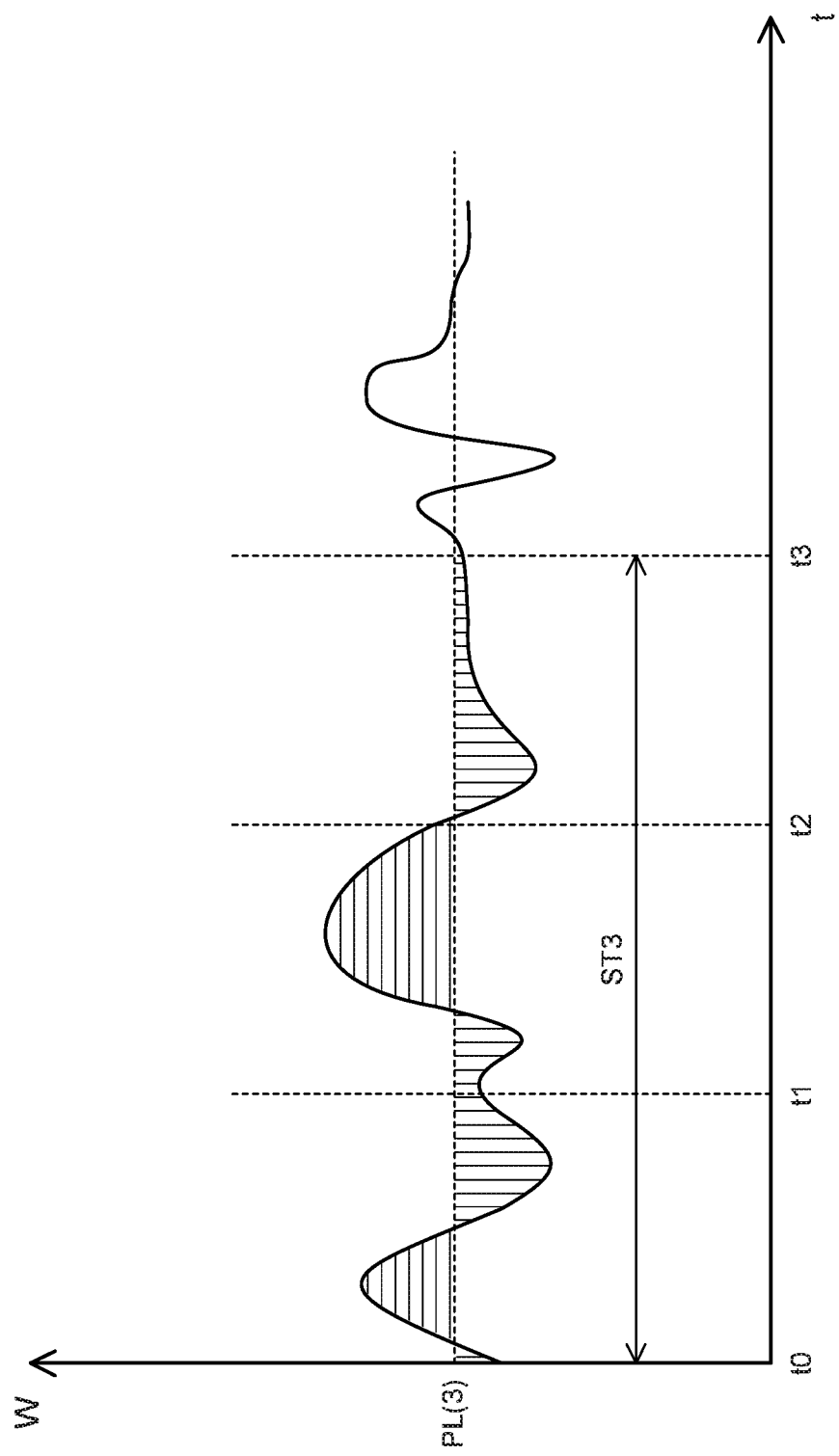
FIG. 5 is a diagram for describing the example of the PL value calculation method based on the consumed energy disclosed in FIG. 2.

As shown in FIG. 5, when the learning period ST3 from the learning period start time t0 to the current time t3 elapses, the supply upper limit value calculation part 32 calculates a PL value by using data of consumed energy during the learning period ST3. To be specific, the supply upper limit value calculation part 32 estimates the amount of charge stored into the battery 22 and the amount of discharge from the battery 22 during the entire learning period ST3 by using the consumed energy during the learning period ST3, and calculates a PL value such that the amount of charge balances with the amount of discharge, that is, the amount of charge becomes equal to the amount of discharge (step S11 of FIG. 11). In the example shown in FIG. 5, a value PL(3) is assumed to be calculated as the PL value of the learning period ST3.

After that, the supply upper limit value calculation part 32 checks whether or not power capping will occur, by using the calculated PL value (steps S12 and S13 of FIG. 11) and, in the case of determining that power capping will occur, recalculates the PL value of the learning period ST3. To be specific, first, the supply upper limit value calculation part 32 performs simulation, which is setting the calculated PL value PL(3) for the consumed energy during the learning period ST3, estimating the amount of charge stored into the battery 22 and the amount of discharge from the battery 22 associated with change of time, and calculating the residual energy in the battery 22 (step S12 of FIG. 11). Then, the supply upper limit value calculation part 32 checks whether or not the residual energy in the battery 22 runs short in the learning period ST3, that is, whether or not the residual energy in the battery 22 becomes equal to or less than a threshold (for example, "0") which is set so that power capping for limiting power consumption of the server 10 occurs (step S13 of FIG. 11).

Figure 6:
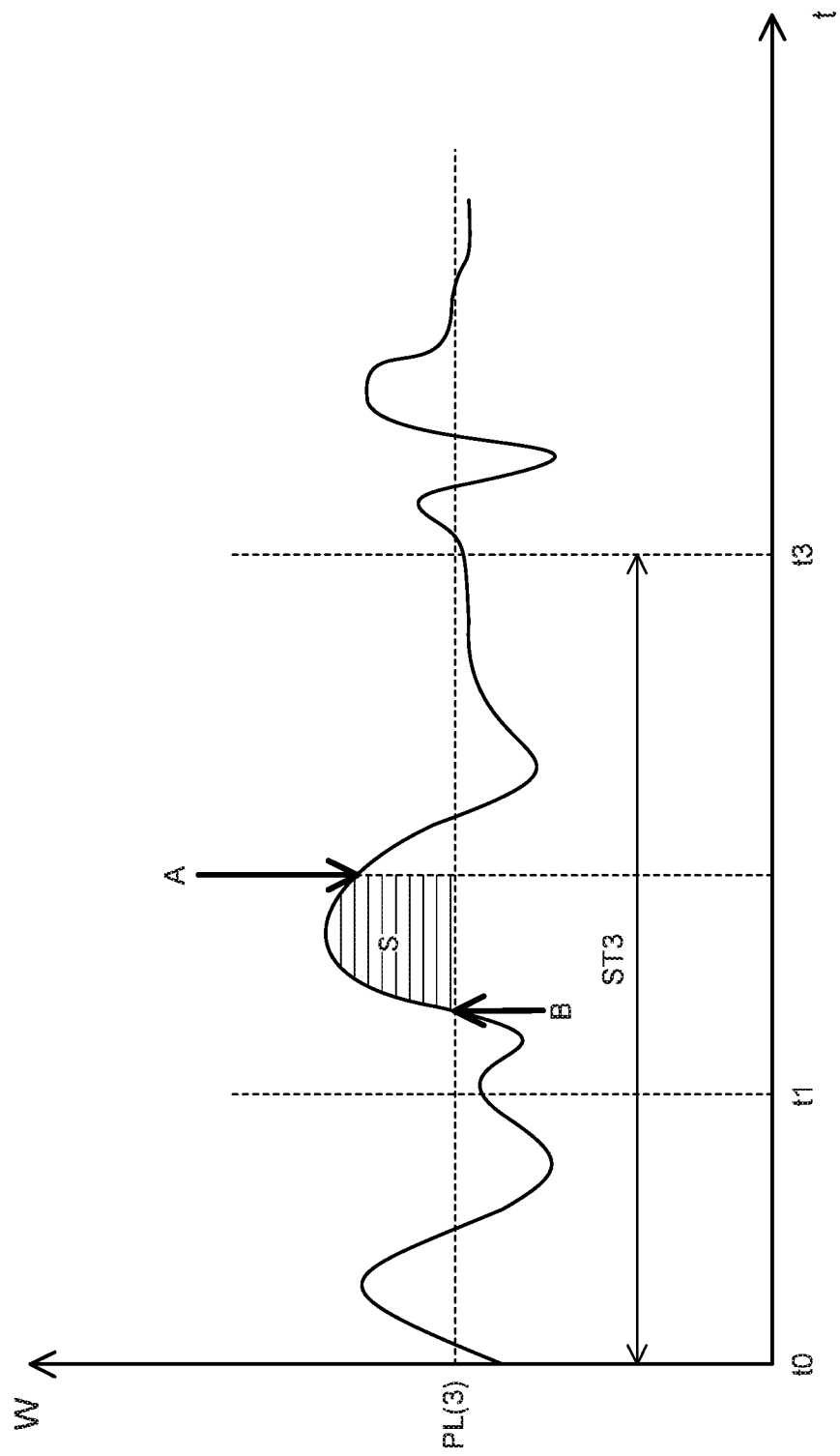
FIG. 6 is a diagram for describing the example of the PL value calculation method based on the consumed energy disclosed in FIG. 2.

Herein, it is assumed to be determined that at time indicated by arrow A in FIG. 6, the residual energy in the battery 22 becomes equal to or less than a threshold (for example, 0) and power capping will occur (step S13 of FIG. 11: Yes). In this case, the supply upper limit value calculation part 32 recalculates the PL value of the learning period ST3 by using the data of the consumed energy earlier than the time when power capping occurs.

Figure 7:
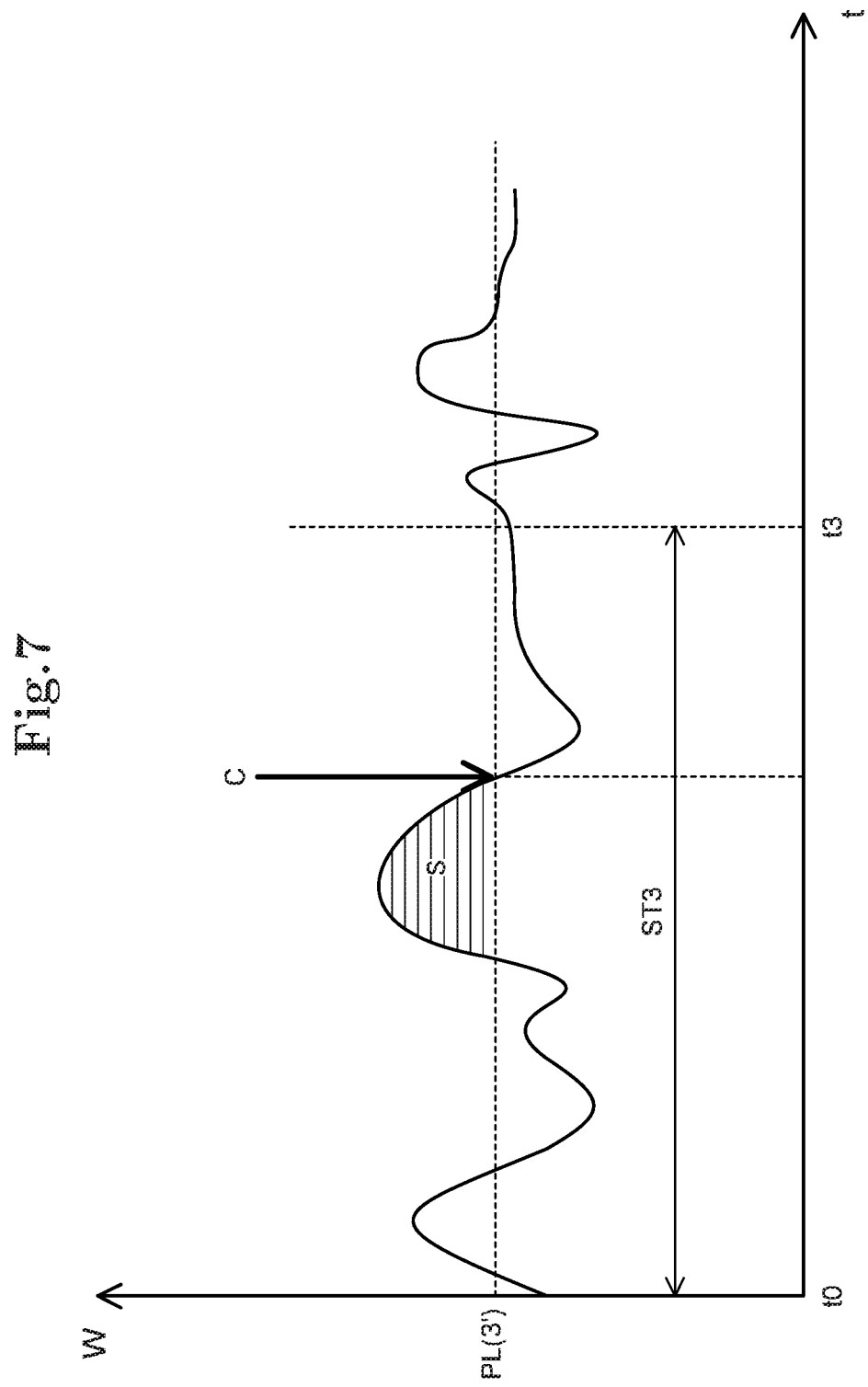
FIG. 7 is a diagram for describing the example of the PL value calculation method based on the consumed energy disclosed in FIG. 2.

To be specific, first, on the basis of the consumed energy and the value PL(3), the supply upper limit value calculation part 32 estimates the amount of discharge in a series of discharging operations by the battery 22 immediately before the time when power capping occurs. Herein, it corresponds to a region indicated by a portion hashed with vertical lines, denoted by symbol S in FIG. 6. Moreover, the supply upper limit value calculation part 32 estimates the residual energy (the amount of charge) of the battery 22 at the start of the series of discharging operations by the battery 22 immediately before the time when power capping occurs. Herein, the supply upper limit value calculation part 32 estimates the residual energy in the battery 22 at time indicated by arrow B in FIG. 6. Then, the supply upper limit value calculation part 32 recalculates the PL value of the learning period ST3 so that the residual energy in the battery 22 at the start of the discharge balances with the amount of discharge. Herein, as shown by arrow C in FIG. 7, the supply upper limit value calculation part 32 calculates a PL value so that a difference between the residual energy in the battery 22 at the start of the discharge and the amount of discharge S becomes "0" (the threshold) (step S14 of FIG. 11). Then, as shown in FIG. 7, a value PL(3'), which is larger than the previous value PL(3), can be calculated as a new PL value of the learning period ST3. The supply upper limit value calculation part 32 replaces the PL value PL(3) of the learning period ST3 with the value PL(3') (step S15 of FIG. 11).

Meanwhile, the new PL value described above is not limited to a value calculated by the abovementioned calculation method, and may be calculated by another method. For example, a PL value such that a value obtained by subtracting the amount of discharge S from the residual energy in the battery 22 at the start of discharge becomes the threshold or less, that is, the residual energy in the battery 22 becomes the threshold or less may be calculated.

Figure 8:
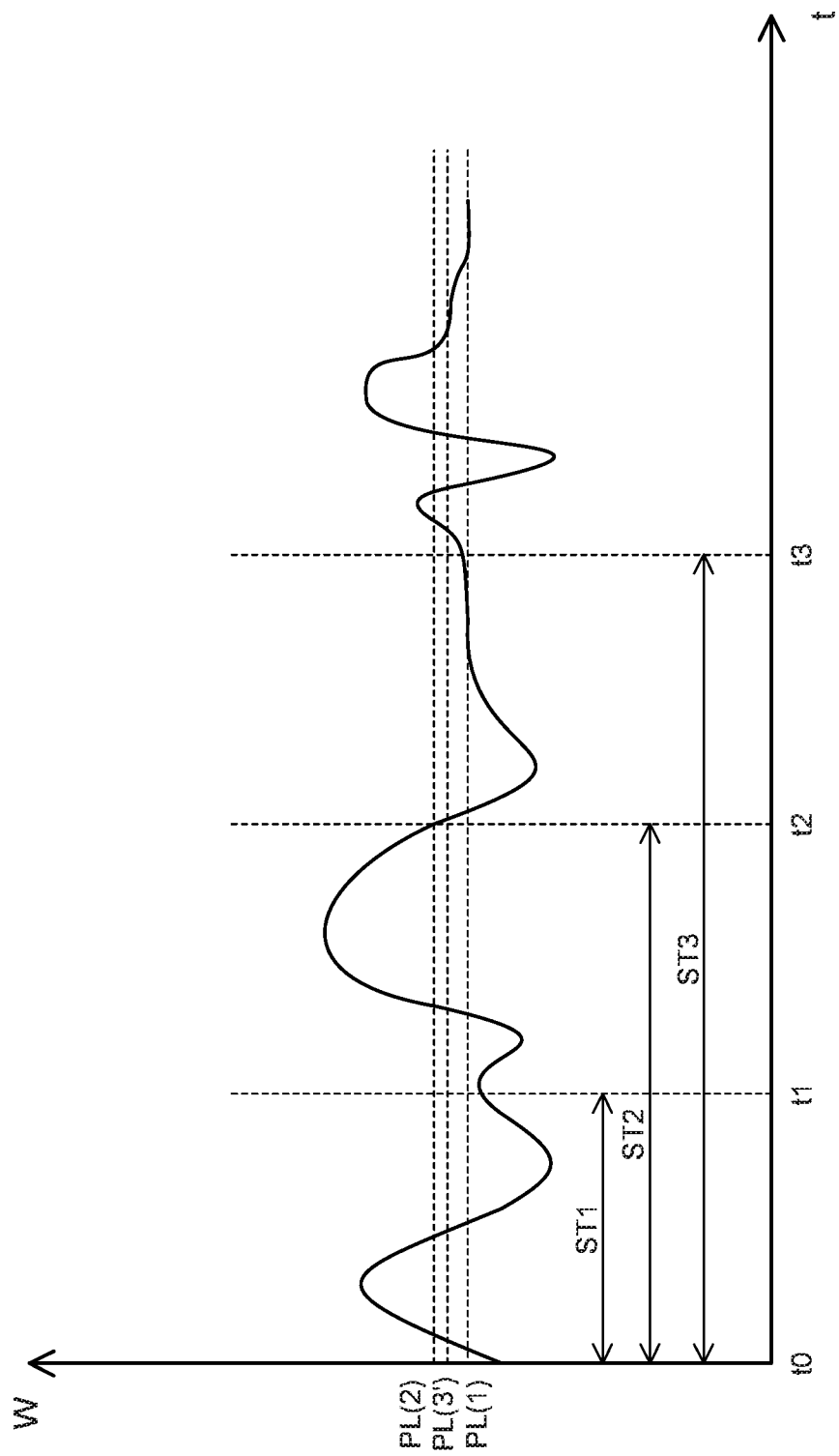
FIG. 8 is a diagram for describing the example of the PL value calculation method based on the consumed energy disclosed in FIG. 2.
Figure 9:
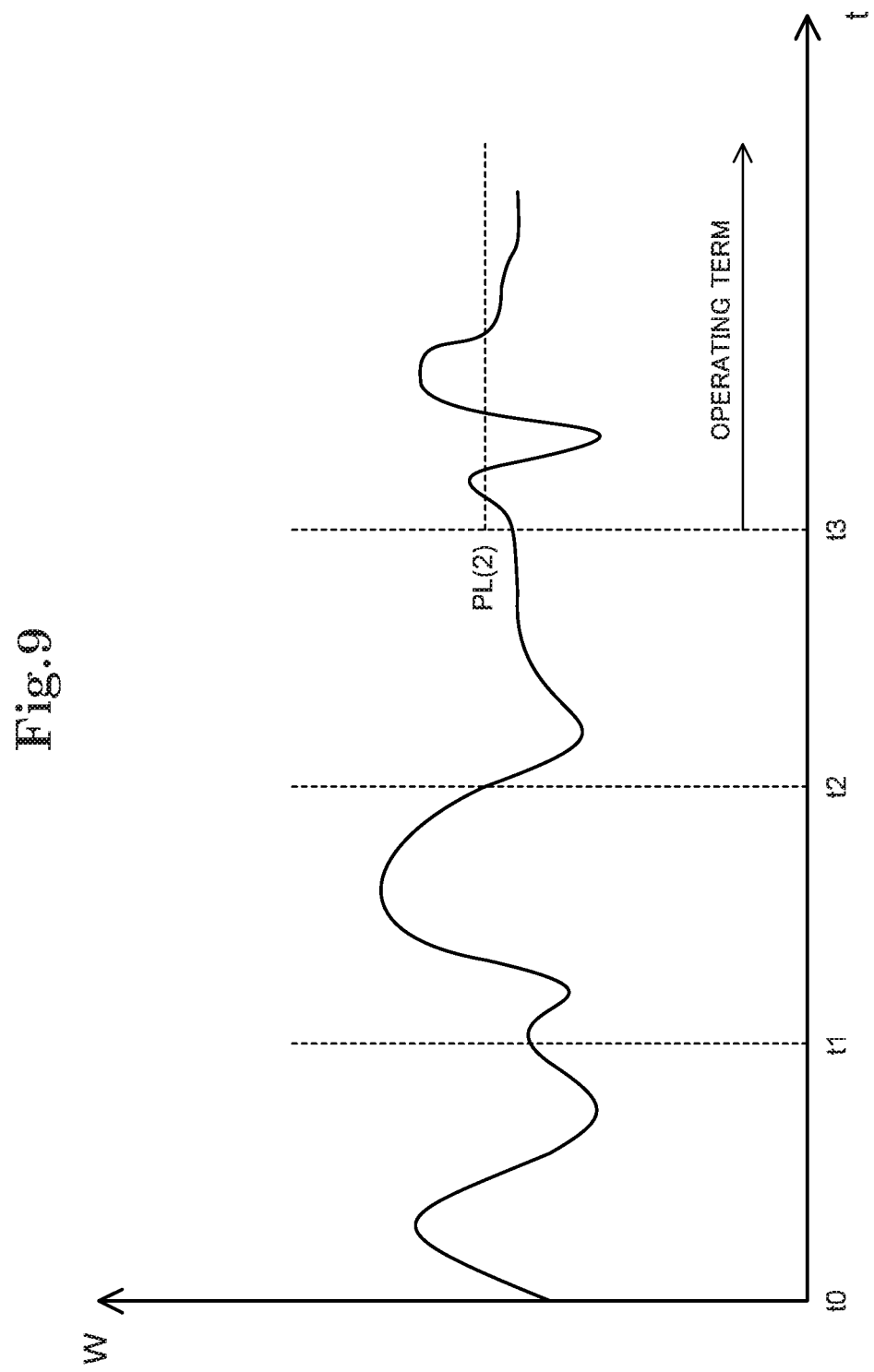
FIG. 9 is a diagram showing a state in which a calculated PL value is set.

Subsequently, the supply upper limit value calculation part 32 compares the calculated PL value with a PL value calculated and stored before (step S4 of FIG. 10), and stores a larger one (step S5 of FIG. 10). Herein, because the PL value PL(2) of the learning period ST2 has been stored and the PL value PL(3') of the learning period ST3 is smaller, the value PL(2) is kept stored. In other words, as shown in FIG. 8, among the PL values calculated in the learning periods ST1, ST2 and ST3, respectively, the largest value PL(2) is specified.

When all the learning periods ST1, ST2 and ST3 thus end, the process enters the "operating period" (step S6 of FIG. 10: Yes). Then, the supply upper limit value setting part 33 (a control unit) sets PL(2), which is a PL value calculated in the abovementioned way and specified as the largest value, in the power supply module 20 (step S7 of FIG. 10). Consequently, the power supply device 21 operates so as to supply the server 10 with energy whose upper limit value is the set PL value in the following operating period. In other words, the supply upper limit value setting part 33 executes control so that energy supplied by the power supply device 21 does not exceed the PL value.

Meanwhile, when controlling energy supplied to the server 10, the power supply device 21 may execute the control by using a value showing the characteristic of the supplied energy, such as the value of power supply (W) and the value of electric current (A). According to this, the PL value may also be set by using a value showing the characteristic of the supplied energy, such as the value of power supply (W) and the value of electric current (A). Meanwhile, the value showing the characteristic of the supplied energy is not limited to the value of power supply or electric current, and may be another value.

Thus, according to the information processing system in this exemplary embodiment, a new PL value to be set is calculated by using consumed energy when the server 10 is caused to actually operate. Consequently, it is possible to effectively use the peak assist function by operation of the battery 22 while preventing the residual energy in the battery 22 from excessively decreasing. As a result, it is possible to efficiently use facilities without waste and increase the performance of the peak assist function.

After the operation starts, as described above, the power extraction part 31 detects power consumption and the residual energy in the battery 22, and notifies them to the power information storage part 40 and the capping value calculation part 34.

Then, the capping value calculation part 34 calculates the upper limit value (a capping value) of power consumption of the server 10 in accordance with the residual energy in the battery 22 notified by the power extraction part 31. For example, in a case where the residual energy in the battery 22 becomes less than the threshold, the capping value calculation part 34 calculates available power only from the power supply device 21 as the capping value. The capping value setting part 35 sets the calculated capping value into the server 10. Consequently, the server 10 operates with power equal to or less than the capping power, so that it is possible to avoid server down though processing performance decreases.

Meanwhile, a new PL value may be calculated and set in the abovementioned manner by using the power consumption stored in the power information storage part 40 after the operation starts.

Second Exemplary Embodiment

Figure 12:
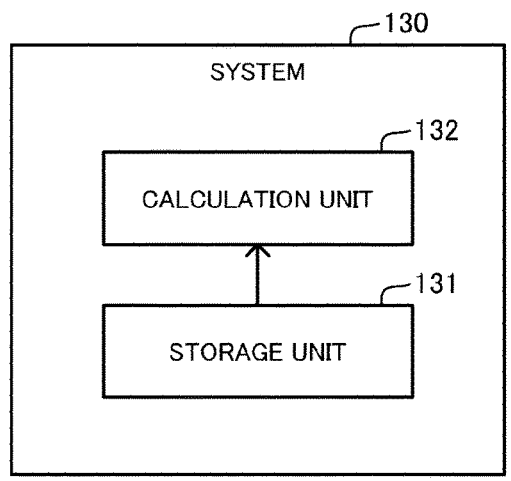
FIG. 12 is a block diagram showing the configuration of an information processing system according to a second exemplary embodiment of the present invention.

Next, a second exemplary embodiment of the present invention will be described referring to FIG. 12. FIG. 12 is a block diagram showing the configuration of a system according to the present invention.

As shown in FIG. 12, a system 130 includes a storage unit 131 and a calculation unit 132. The storage unit 131 stores the value of consumed energy of an information processing device configured so as to be supplied with power by a power supply device and a power storage device charged by the power supply device. The calculation unit 132 calculates a power supply device upper limit value which is set as the upper limit value of a value showing the characteristic of energy supplied from the power supply device to the information processing device. To be specific, the calculation unit 132 calculates a power supply device upper limit value on the basis of consumed energy in a given period. The abovementioned calculation unit is configured by execution of a program by an arithmetic device included by the system 130.

Thus, the system in this exemplary embodiment calculates and sets a power supply device upper limit value, which is the upper limit value of power supply of the power supply device, on the basis of consumed energy when the information processing device supplied with power by the power supply device and the power storage device is caused to operate actually. Consequently, it is possible to effectively use the peak assist function by operation of the power storage device while preventing the residual energy in the power storage device from excessively decreasing. As a result, it is possible to efficiently use facilities without waste, and it is possible to increase the performance of the peal assist function.

Third Exemplary Embodiment

Figure 13:
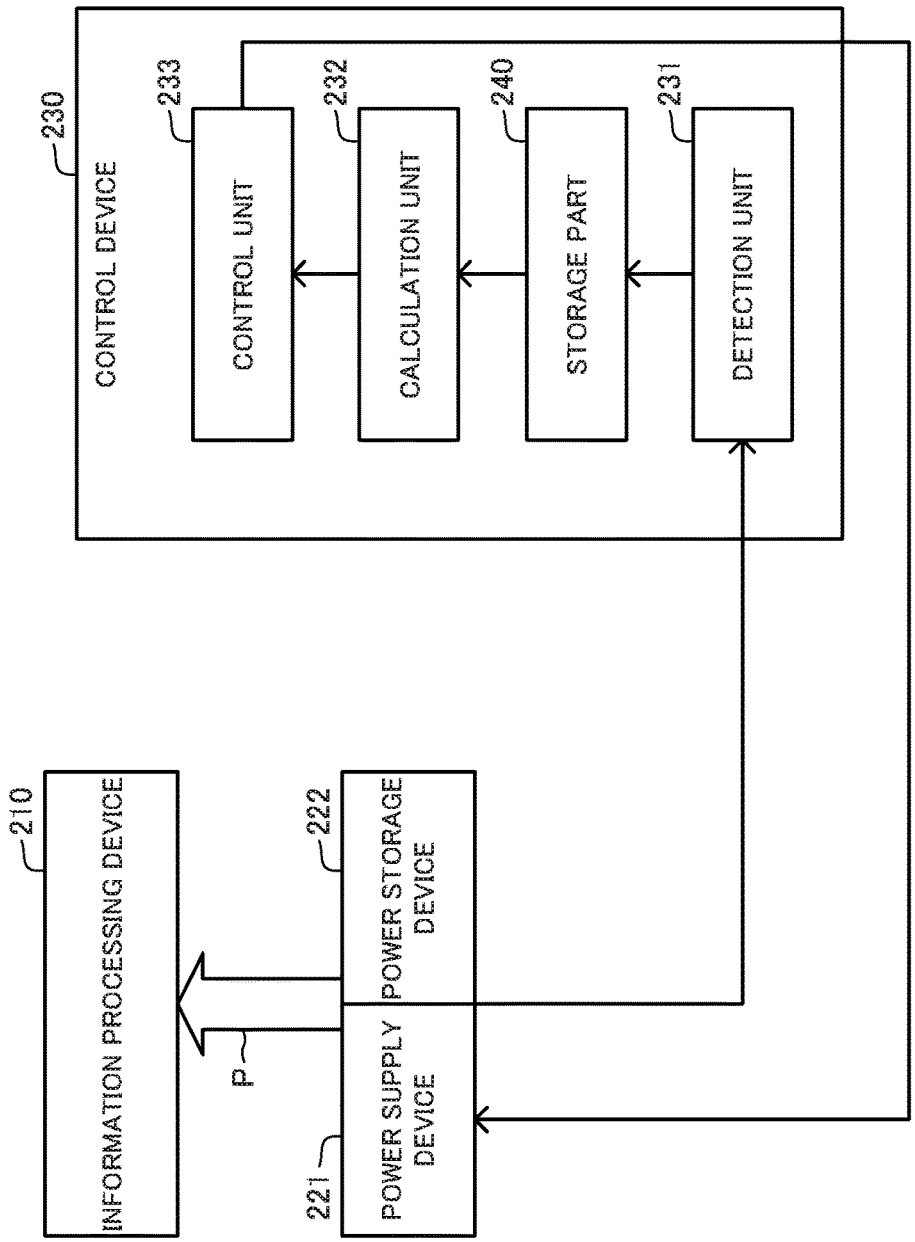
FIG. 13 is a block diagram showing the configuration of an information processing system according to a third exemplary embodiment of the present invention.

Next, a third exemplary embodiment of the present invention will be described referring to FIG. 13. FIG. 13 is a block diagram showing the configuration of a power supply system according to the present invention.

As shown in FIG. 13, the power supply system includes an information processing device 210, a power supply device 221, a power storage device 222, and a control device 230. The control device 230 includes a detection unit 231, a calculation unit 232 and a control unit 233, which are constructed by execution of a program by an arithmetic device included therein.

Moreover, the control device includes a storage unit 240.

The detection unit 231 detects consumed energy of the information processing device 210 and stores it into the storage unit 240. The calculation unit 232 calculates a power supply device upper limit value, which is the upper limit value of a value showing the characteristic of energy supplied from the power supply device 221 to the information processing device 210, on the basis of the stored consumed energy in a given period. The control unit 233 controls power supply to the information processing device 210 from the power supply device 221 and the power storage device 222 charged by the power supply device 221. In specific, the control unit 233 controls a value showing the characteristic of energy supplied from the power supply device 221 not to exceed the calculated power supply device upper limit value. The power supply device 221 and the power storage device 222 configure a power supply module.

Thus, according to the power supply system of this exemplary embodiment, a power supply device upper limit value, which is the upper limit value of energy supplied by the power supply device 221, is calculated and set on the basis of consumed energy at the time of actually operating the information processing device 210 supplied with power by the power supply device 221 and the power storage device 223. Consequently, it is possible to effectively use the peak assist function by operation of the power storage device while preventing the residual energy in the power storage device 222 from excessively decreasing. As a result, it is possible to efficiently use facilities without waste, and it is possible to increase the performance of the peal assist function.

<Supplementary Notes>

The whole or part of the exemplary embodiments disclosed above can be described as in the following supplementary notes. Below, the configurations of a system, a control unit, a program, a power supply system, an arithmetic method and a power control method will be schematically described. However, the present invention is not limited to the following configurations.

(Supplementary Note 1)
A system comprising:
a storage unit configured to store a value of consumed energy of an information processing device configured to be supplied with power by a power supply device and a power storage device charged by the power supply device; and
a calculation unit configured to calculate a power supply device upper limit value set as an upper limit value of a value representing a characteristic of energy supplied from the power supply device to the information processing device,
wherein the calculation unit is configured to calculate the power supply device upper limit value on a basis of the consumed energy in a predetermined period.

(Supplementary Note 2)
The system according to supplementary note 1, wherein the calculation unit is configured to calculate the power supply device upper limit value on a basis of the consumed energy in the predetermined period and an amount of charge stored into the power storage device and an amount of discharge from the power storage device.

(Supplementary Note 3)
The system according to supplementary note 2, wherein the calculation unit is configured to estimate the amount of charge stored into the power storage device and the amount of discharge from the power storage device on a basis of the consumed energy in the predetermined period, and calculate the power supply device upper limit value on a basis of the estimated amount of charge and amount of discharge.

(Supplementary Note 4)
The system according to supplementary note 2 or 3, wherein the calculation unit is configured to calculate the power supply device upper limit value so that the amount of charge stored into the power storage device balances with the amount of discharge from the power storage device.

(Supplementary Note 5)
The system according to any of supplementary notes 1 to 4, wherein the calculation unit is configured to, at a time when an amount of charge in the power storage device becomes a threshold or less, calculate a new power supply device upper limit value in a predetermined period on a basis of the consumed energy before the time.

(Supplementary Note 6)
The system according to any of supplementary notes 1 to 4, wherein the calculation unit is configured to, by using the calculated power supply device upper limit value, estimate an amount of charge stored into the power storage device and an amount of discharge from the power storage device associated with change of time on a basis of the consumed energy and, at a time when the estimated amount of charge becomes a threshold or less, calculate a new power supply device upper limit value in a predetermined period on a basis of the consumed energy before the time.

(Supplementary Note 7)
The system according to supplementary note 5 or 6, wherein the calculation unit is configured to calculate the new power supply device upper limit value on a basis of an amount of discharge from the power storage device before the time when the amount of charge in the power storage device becomes the threshold or less.

(Supplementary Note 8)
The system according to supplementary note 7, wherein the calculation unit is configured to calculate the new power supply device upper limit value on a basis of an amount of discharge from the power storage device associated with a series of discharge operations immediately before the time when the amount of charge in the power storage device becomes the threshold or less.

(Supplementary Note 9)

The system according to supplementary note 8, wherein the calculation unit is configured to calculate the new power supply device upper limit value so that the amount of discharge from the power storage device associated with the series of discharge operations immediately before the time when the amount of charge in the power storage device becomes the threshold or less balances with the amount of charge before start of the series of discharge operations.

(Supplementary Note 10)

The system according any of supplementary notes 1 to 9, wherein the calculation unit is configured to calculate power supply device upper limit values for respective predetermined periods and specify a largest power supply device upper limit value.

(Supplementary Note 11)

The system according to supplementary note 10, further comprising a control unit configured to control the value representing the characteristic of energy supplied from the power supply device not to exceed the largest power supply device upper limit value specified by the calculation unit.

(Supplementary Note 11.1)

The system according to supplementary note 10, further comprising: a control unit configured to control supply of power to the information processing device by the power supply device and the power storage device; and a detection unit configured to detect the consumed energy of the information processing device and store the consumed energy into the storage unit, wherein:

the calculation unit is configured to calculate the power supply device upper limit value on a basis of the consumed energy in the predetermined period; and the control unit is configured to control the value representing the characteristic of energy supplied from the power supply device not to exceed the power supply device upper limit value calculated by the calculation unit.

(Supplementary Note 12)

A control device comprising:

a control unit configured to control supply of power to an information processing device by a power supply device and a power storage device charged by the power supply device;

a detection unit configured to detect consumed energy of the information processing device and store the consumed energy into a storage unit; and a calculation unit configured to calculate a power supply device upper limit value as an upper limit value of a value representing a characteristic of energy supplied from the power supply device to the information processing device, wherein:

the calculation unit is configured to calculate the power supply device upper limit value on a basis of the consumed energy in a predetermined period; and the control unit is configured to control the value representing the characteristic of energy supplied from the power supply device not to exceed the power supply device upper limit value calculated by the calculation unit.

(Supplementary Note 13)

A power supply system comprising:

a power supply module including a power supply device and a power storage device charged by the power supply device; and a control device having a control unit configured to control supply of power to an information processing device by the power supply module, wherein:

the control device includes:

a detection unit configured to detect consumed energy of the information processing device and store the consumed energy into a storage unit; and a calculation unit configured to calculate a power supply device upper limit value as an upper limit value of a value representing a characteristic of energy supplied from the power supply device to the information processing device;

the calculation unit is configured to calculate the power supply device upper limit value on a basis of the consumed energy in a predetermined period; and the control unit is configured to control the value representing the characteristic of energy supplied from the power supply device not to exceed the power supply device upper limit value calculated by the calculation unit.

(Supplementary Note 14)

A non-transitory computer-readable medium storing a program comprising instructions for causing an arithmetic device to realize:

a calculation unit configured to calculate a power supply device upper limit value on a basis of consumed energy of an information processing device in a predetermined period among values of consumed energy of the information processing device, the power supply device upper limit value being set as an upper limit value of a value representing a characteristic of energy supplied from the power supply device to the information processing device, the information processing device being configured to be supplied with power by a power supply device and a power storage device charged by the power supply device, the values of the consumed energy being stored in a storage device.

(Supplementary Note 15.1)

An arithmetic method comprising:

storing a value of consumed energy of an information processing device configured to be supplied with power by a power supply device and a power storage device charged by the power supply device; and calculating a power supply device upper limit value on a basis of the stored consumed energy in a predetermined period, the power supply device upper limit value being set as an upper limit value of a value representing a characteristic of energy supplied from the power supply device to the information processing device.

(Supplementary Note 15.2)

The arithmetic method according to supplementary note 15.1, wherein the power supply device upper limit value is calculated on a basis of the consumed energy in the predetermined period and an amount of charge stored into the power storage device and an amount of discharge from the power storage device.

(Supplementary Note 15.3)

The arithmetic method according to supplementary note 15.2, wherein the amount of charge stored into the power storage device and the amount of discharge from the power storage device are estimated on a basis of the consumed energy in the predetermined period, and the power supply device upper limit value is calculated on a basis of the estimated amount of charge and amount of discharge.

(Supplementary Note 15.4)

The arithmetic method according to supplementary note 15.2 or 15.3, wherein the power supply device upper limit value is calculated so that the amount of charge stored into the power storage device balances with the amount of discharge from the power storage device.

(Supplementary Note 15.5)

The arithmetic method according to any of supplementary notes 15.1 to 15.4, wherein at a time when an amount of charge in the power storage device becomes a threshold or less, a new power supply device upper limit value in a predetermined period is calculated on a basis of the consumed energy before the time.

(Supplementary Note 15.6)

The arithmetic method according to any of supplementary notes 15.1 to 15.4, wherein by using the calculated power supply device upper limit value, an amount of charge stored into the power storage device and an amount of discharge from the power storage device associated with change of time are estimated on a basis of the consumed energy and, at a time when the estimated amount of charge becomes a threshold or less, a new power supply device upper limit value in a predetermined period is calculated on a basis of the consumed energy before the time.

(Supplementary Note 15.7)

The arithmetic method according to supplementary note 15.5 or 15.6, wherein the new power supply device upper limit value is calculated on a basis of an amount of discharge from the power storage device before the time when the amount of charge in the power storage device becomes the threshold or less.

(Supplementary Note 15.8)

The arithmetic method according to supplementary note 15.7, wherein the new power supply device upper limit value is calculated on a basis of an amount of discharge from the power storage device associated with a series of discharge operations immediately before the time when the amount of charge in the power storage device becomes the threshold or less.

(Supplementary Note 15.9)

The arithmetic method according to supplementary note 8, wherein the new power supply device upper limit value is calculated so that the amount of discharge from the power storage device associated with the series of discharge operations immediately before the time when the amount of charge in the power storage device becomes the threshold or less balances with the amount of charge before start of the series of discharge operations (Supplementary Note 15.10)

The arithmetic method according any of supplementary notes 15.1 to 15.9, wherein power supply device upper limit values are calculated for respective predetermined periods and a largest power supply device upper limit value is specified.

(Supplementary Note 15.11)

The arithmetic method according to supplementary note 15.10, further comprising controlling the value representing the characteristic of energy supplied from the power supply device not to exceed the largest power supply device upper limit value.

(Supplementary Note 15.12)

The arithmetic method according to any of supplementary notes 15.1 to 15.11, further comprising:

detecting consumed energy of the information processing device and storing the consumed energy into the storage unit;

calculating the power supply device upper limit value on a basis of the stored consumed energy in the predetermined period; and controlling supply of power to the information processing device by the power supply device and the power storage device, and also controlling the value representing the characteristic of energy supplied from the power supply device not to exceed the calculated power supply device upper limit value.

(Supplementary Note 16)

A power supply method for controlling supply of power to an information processing device by a power supply device and a power storage device charged by the power supply device, the power supply method comprising:

detecting consumed energy of the information processing device and storing the consumed energy into a storage unit;

calculating a power supply device upper limit value on a basis of the stored consumed energy in a predetermined period, the power supply device upper limit value being an upper limit value of a value representing a characteristic of energy supplied from the power supply device to the information processing device; and controlling the value representing the characteristic of energy supplied from the power supply device not to exceed the calculated power supply device upper limit value.

The abovementioned program is stored in a storage device or recorded on a computer-readable recording medium. The recording medium is, for example, a portable medium such as a flexible disk, an optical disk, a magneto-optical disk and a semiconductor memory.

Although the present invention is described above referring to the exemplary embodiments and the like, the present invention is not limited to the above exemplary embodiments. The configurations and details of the present invention can be changed in various manners that can be understood by one skilled in the art within the scope of the present invention.

DESCRIPTION OF REFERENCE NUMERALS

10 server
20 power supply module
21 power supply device
22 battery
30 peak assist control device
31 power extraction part
32 supply upper limit value calculation part
33 supply upper limit value setting part
34 capping value calculation part
35 capping value setting part
40 power information storage part
130 system
131 storage unit
132 calculation unit
210 information processing device
221 power supply device
222 power storage device
230 control device
231 detection unit
232 calculation unit
233 control unit
240 storage unit

The invention claimed is:

1. A system comprising:
a memory configured to store a value of consumed energy of an information processing device configured to be supplied with power by a power supply device and a power storage device charged by the power supply device; and
at least one processor configured to calculate a power supply device upper limit value set as an upper limit value of a value representing a characteristic of energy supplied from the power supply device to the information processing device, wherein the at least one processor is further configured to:
estimate an amount of charge stored into the power storage device and an amount of discharge from the power storage device on a basis of the consumed energy in a predetermined period;
calculate the power supply device upper limit value on a basis of the estimated amount of charge and the estimated amount of discharge; and
calculate, at a time when an amount of charge in the power storage device becomes a threshold or less, a new power supply device upper limit value in a predetermined period on a basis of:
the consumed energy before the time; and
an amount of discharge from the power storage device associated with the last discharge operation which occurred before the time when the amount of charge in the power storage device becomes the threshold or less.

2. The system according to claim 1, wherein the at least one processor is configured to calculate the power supply device upper limit value so that the amount of charge stored into the power storage device balances with the amount of discharge from the power storage device.

3. The system according to claim 1, wherein the at least one processor is configured to, by using the calculated power supply device upper limit value, estimate an amount of charge stored into the power storage device and an amount of discharge from the power storage device associated with change of time on a basis of the consumed energy and, at a time when the estimated amount of charge becomes a threshold or less, calculate a new power supply device upper limit value in a predetermined period on a basis of the consumed energy before the time.

4. The system according to claim 1, wherein the at least one processor is configured to calculate the new power supply device upper limit value so that the amount of discharge from the power storage device associated with the last discharge operation which occurred before the time when the amount of charge in the power storage device becomes the threshold or less balances with the amount of charge before start of the series of discharge operations.

5. The system according claim 1, wherein the at least one processor is configured to calculate power supply device upper limit values for respective predetermined periods and specify a largest power supply device upper limit value.

6. The system according to claim 5, wherein the at least one processor is configured to control the value representing the characteristic of energy supplied from the power supply device not to exceed the largest power supply device upper limit value specified by the at least one processor.

7. The system according to claim 1, wherein the at least one processor is configured to:
control supply of power to the information processing device by the power supply device and the power storage device;
detect consumed energy of the information processing device and store the consumed energy into the memory;
calculate the power supply device upper limit value on a basis of the consumed energy in the predetermined period; and
control the value representing the characteristic of energy supplied from the power supply device not to exceed the power supply device upper limit value calculated by the at least one processor.

8. A power supply system comprising:
a power supply module including a power supply device and a power storage device charged by the power supply device; and
at least one processor configured to:
control supply of power to an information processing device by the power supply module;
detect consumed energy of the information processing device and store the consumed energy into a memory;
calculate a power supply device upper limit value as an upper limit value of a value representing a characteristic of energy supplied from the power supply device to the information processing device;
estimate an amount of charge stored into the power storage device and an amount of discharge from the power storage device on a basis of the consumed energy in a predetermined period,
calculate the power supply device upper limit value on a basis of the estimated amount of charge and the estimated amount of discharge,
calculate, at a time when an amount of charge in the power storage device becomes a threshold or less, a new power supply device upper limit value in a predetermined period on a basis of:
the consumed energy before the time, and
an amount of discharge from the power storage device associated with the last discharge operation which occurred before the time when the amount of charge in the power storage device becomes the threshold or less, and
control the value representing the characteristic of energy supplied from the power supply device not to exceed the new power supply device upper limit value calculated by the at least one processor.

9. A computer-implemented method comprising:
storing a value of consumed energy of an information processing device configured to be supplied with power by a power supply device and a power storage device charged by the power supply device;
estimating, using at least one processor, an amount of charge stored into the power storage device and an amount of discharge from the power storage device on a basis of the stored consumed energy in a predetermined period; and
calculating, using the at least one processor, a power supply device upper limit value being set as an upper limit value of a value representing a characteristic of energy supplied from the power supply device to the information processing device, and on a basis of the estimated amount of charge and the estimated amount of discharge;
calculating, using the at least one processor, at a time when an amount of charge in the power storage device becomes a threshold or less, a new power supply device upper limit value in a predetermined period on a basis of:
the consumed energy before the time; and
an amount of discharge from the power storage device associated with the last discharge operation which occurred before the time when the amount of charge in the power storage device becomes the threshold or less.

10. The computer-implemented method according to claim 9, further comprising:
- detecting consumed energy of the information processing device and storing the consumed energy into a memory;
- calculating the power supply device upper limit value on a basis of the stored consumed energy in the predetermined period; and
- controlling supply of power to the information processing device by the power supply device and the power storage device, and also controlling the value representing the characteristic of energy supplied from the power supply device not to exceed the calculated power supply device upper limit value.

11. A system comprising:
- a memory configured to store a value of consumed energy of an information processing device configured to be supplied with power by a power supply device and a power storage device charged by the power supply device; and
- at least one processor configured to calculate a power supply device upper limit value set as an upper limit value of a value representing a characteristic of energy supplied from the power supply device to the information processing device, wherein the at least one processor is configured to, at a time when an amount of charge in the power storage device becomes a threshold or less, calculate a new power supply device upper limit value in a predetermined period on a basis of the consumed energy before the time, and calculate the new power supply device upper limit value on a basis of an amount of discharge from the power storage device associated with the last discharge operation which occurred before the time when the amount of charge in the power storage device becomes the threshold or less.

* * * * *